US008526058B2

(12) United States Patent
Yamazaki

(10) Patent No.: US 8,526,058 B2
(45) Date of Patent: Sep. 3, 2013

(54) IMAGE FORMING APPARATUS, IMAGE FORMING SYSTEM AND RECORDING MEDIUM

(75) Inventor: Masataka Yamazaki, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 169 days.

(21) Appl. No.: 13/052,550

(22) Filed: Mar. 21, 2011

(65) Prior Publication Data

US 2011/0249278 A1 Oct. 13, 2011

(30) Foreign Application Priority Data

Apr. 13, 2010 (JP) ................................ 2010-092150

(51) Int. Cl.
*H04N 1/60* (2006.01)
*G06F 3/12* (2006.01)

(52) U.S. Cl.
USPC ........... 358/1.9; 358/1.13; 358/3.24; 358/504

(58) Field of Classification Search
None
See application file for complete search history.

(56) References Cited

U.S. PATENT DOCUMENTS

| | | | | |
|---|---|---|---|---|
| 4,326,222 | A * | 4/1982 | Connin et al. | 358/493 |
| 5,023,662 | A | 6/1991 | Kusumoto et al. | |
| 5,778,276 | A | 7/1998 | Hasegawa | |
| 7,889,372 | B2 | 2/2011 | Iwasaki | |
| 2007/0002354 | A1 | 1/2007 | Iwasaki | |
| 2007/0147888 | A1 | 6/2007 | Igarashi et al. | |
| 2007/0147889 | A1 | 6/2007 | Kamimura | |
| 2007/0183814 | A1 | 8/2007 | Kamimura | |
| 2009/0141298 | A1 * | 6/2009 | Kushida | 358/1.12 |
| 2011/0096347 | A1 | 4/2011 | Iwasaki | |

FOREIGN PATENT DOCUMENTS

| | | | |
|---|---|---|---|
| JP | 2001066842 | A | 3/2001 |
| JP | 2001305818 | A | 11/2001 |
| JP | 2003307901 | A | 10/2003 |
| JP | 2004045905 | A | 2/2004 |
| JP | 2005111770 | A | 4/2005 |
| JP | 2007011081 | A | 1/2007 |
| JP | 2007011151 | A | 1/2007 |
| JP | 2007-178654 | | 7/2007 |
| JP | 2007-199651 | | 8/2007 |

(Continued)

OTHER PUBLICATIONS

Decision of Refusal for corresponding Japanese Patent Application No. 2010-092150 dated Jul. 26, 2012.

(Continued)

*Primary Examiner* — Dov Popovici
(74) *Attorney, Agent, or Firm* — Banner & Witcoff, Ltd.

(57) ABSTRACT

An image forming apparatus including: a forming section; a correction section configured to measure at least one of a position and a density of a formed image and perform a correction function for adjusting an image forming condition based on the measurement; a determination section configured to determine whether a color condition is satisfied; and a control section configured to selectively perform a first mode or a second mode if there is a print request while a correction execution condition satisfied, wherein in the first mode, the correction section is caused to perform the correction function, before a printing process begins in response to the print request, and wherein in the second mode, the correction section is caused to perform the correction function at least before the printing process to the color page data, on condition that the determination section determines that the color condition is satisfied.

8 Claims, 8 Drawing Sheets

(56) References Cited

FOREIGN PATENT DOCUMENTS

| | | |
|---|---|---|
| JP | 2007-199652 | 8/2007 |
| JP | 2008-083151 | 4/2008 |
| JP | 2008-083152 | 4/2008 |
| JP | 2008134462 A | 6/2008 |
| JP | 2009-134149 | 6/2009 |

OTHER PUBLICATIONS

Notification for Reason for Refusal for Japanese patent application No. 2010-092150 mailed Feb. 23, 2012.

Extended European search report for application No. 11002314.0 mailed May 10, 2012.

* cited by examiner

EXAMPLE 1 <EXECUTING COLOR MODE>

EXAMPLE 2 <EXECUTING AUTOMATIC MODE>

EXAMPLE 4 <EXECUTING AUTOMATIC MODE>

IMAGE FORMING APPARATUS, IMAGE FORMING SYSTEM AND RECORDING MEDIUM

CROSS-REFERENCE TO RELATED APPLICATIONS

This application claims priority from Japanese Patent Application No. 2010-092150 filed on Apr. 13, 2010, the entire contents of which are incorporated herein by reference.

TECHNICAL FIELD

Aspects of the present invention relates to an image forming apparatus, an image forming system, and a recording medium, which measure, for example, a position deviation or a density deviation of a formed image, and adjust an image forming condition based on the measurement.

BACKGROUND

A related-art image forming apparatus performs a correction function by measuring, for example, non-uniformity in a position or a density of an image formed, and then adjusting an image forming condition based on the measurement. Specifically, the related-art image forming apparatus having the correction function performs the correction function, provided that a predetermined execution condition, for example, a cover of a body casing of the apparatus is opened or closed, is satisfied, and the apparatus receives a print request which instructs color printing. The related-art image forming apparatus performs the correction function before the execution of a printing process based on such print request. Meanwhile, in case of monochrome printing, non-uniformity in an image forming position or a non-uniformity in a density generally has relatively little influence on image quality. Therefore, the correction function is not executed in the monochrome printing, so as to lower the processing load.

In the related-art image forming apparatus, the correction function is not performed during a printing process in response to a single print request. Thus, for example, a problem that, the correction function is performed and an image forming condition is adjusted during the printing process in response to the single print request, and a color tone of a printed image differs between before and after the adjustment of the image forming condition so as to lack unity, is prevented.

Meanwhile, in the related-art image forming apparatus, if a color printing is instructed in the print request while the correction execution condition is satisfied, the correction process is always performed regardless of whether the print data actually includes the color page data. Therefore, an unnecessary correction process is performed when the print data does not include the color page data. Therefore, there has been a demand for the convenience in the correction function.

SUMMARY

Accordingly, aspects of the present invention provides an image forming apparatus, an image forming system, and a recording medium, which are capable of improving the convenience in the correction function.

According to an aspect of the present invention, there is provided an image forming apparatus comprising: a forming section configured to form a color image; a correction section configured to measure at least one of a position and a density of an image formed by the forming section and perform a correction function for adjusting an image forming condition based on the measurement; a determination section configured to determine whether a color condition is satisfied, the color condition being satisfied if print data, which is an object of a print request, includes color page data and a control section configured to selectively perform a first mode or a second mode if there is a print request while a correction execution condition satisfied, wherein in the first mode, the correction section is caused to perform the correction function, before a printing process begins in response to the print request, and wherein in the second mode, the correction section is caused to perform the correction function at least before the printing process to the color page data, on condition that the determination section determines that the color condition is satisfied.

According to another aspect of the present invention, there is provided an image forming system including an image forming apparatus and an information processing apparatus communicating with the image forming apparatus, the image forming system comprising: a forming section provided to the image forming apparatus and is configured to form a color image, a correction section configured to measure at least one of a position and a density of an image formed by the forming section and perform a correction function for adjusting an image forming condition based on the measurement, a determination section configured to determine whether a color condition is satisfied, the color condition being satisfied if print data, which is an object of a print request, includes color page data, and a control section configured to selectively perform a first mode or a second mode if there is a print request while a correction execution condition satisfied, wherein in the first mode, the correction section is caused to perform the correction function, before a printing process begins in response to the print request, and wherein in the second mode, the correction section is caused to perform the correction function at least before the printing process to the color page data, on condition that the determination section determines that the color condition is satisfied.

According to another aspect of the present invention, there is provided a computer readable recording medium storing a computer program for causing a computer of an information processing apparatus, which communicates with an image forming apparatus configured to form a color image, measure at least one of a position and a density of a formed image and perform a correction function for adjusting an image forming condition based on the measurement, to perform a method of: determining whether a color condition is satisfied, the color condition being satisfied if print data, which is an object of a print request, includes color page data, and selectively instructing a first mode or a second mode to the image forming apparatus if there is a print request while a correction execution condition satisfied, wherein in the first mode, the correction function is caused to be performed before a printing process begins in response to the print request, and wherein in the second mode, the correction function is caused to be performed at least before the printing process to the color page data, on condition that it is determined that the color condition is satisfied.

According to another aspect of the present invention, there is provided a computer readable recording medium storing a computer program for causing a computer of an image forming apparatus, which includes a forming section configured to form a color image, to perform a method of: measuring at least one of a position and a density of an image formed by the forming section and perform a correction function for adjusting an image forming condition based on the measurement; determining whether a color condition is satisfied, the color condition being satisfied if print data, which is an object of a print request, includes color page data; and selectively performing a first mode or a second mode if there is a print request while a correction execution condition satisfied, wherein in the first mode, the correction function is caused to be performed before a printing process begins in response to the print request, and wherein in the second mode, the correction function is caused to be performed at least before the printing process to the color page data on condition that it is determined that the color condition is satisfied.

DETAILED DESCRIPTION

Hereinafter, an exemplary embodiment of the present invention will be described with reference to the drawings.

(Overall Configuration of a Printer)

Figure 1:
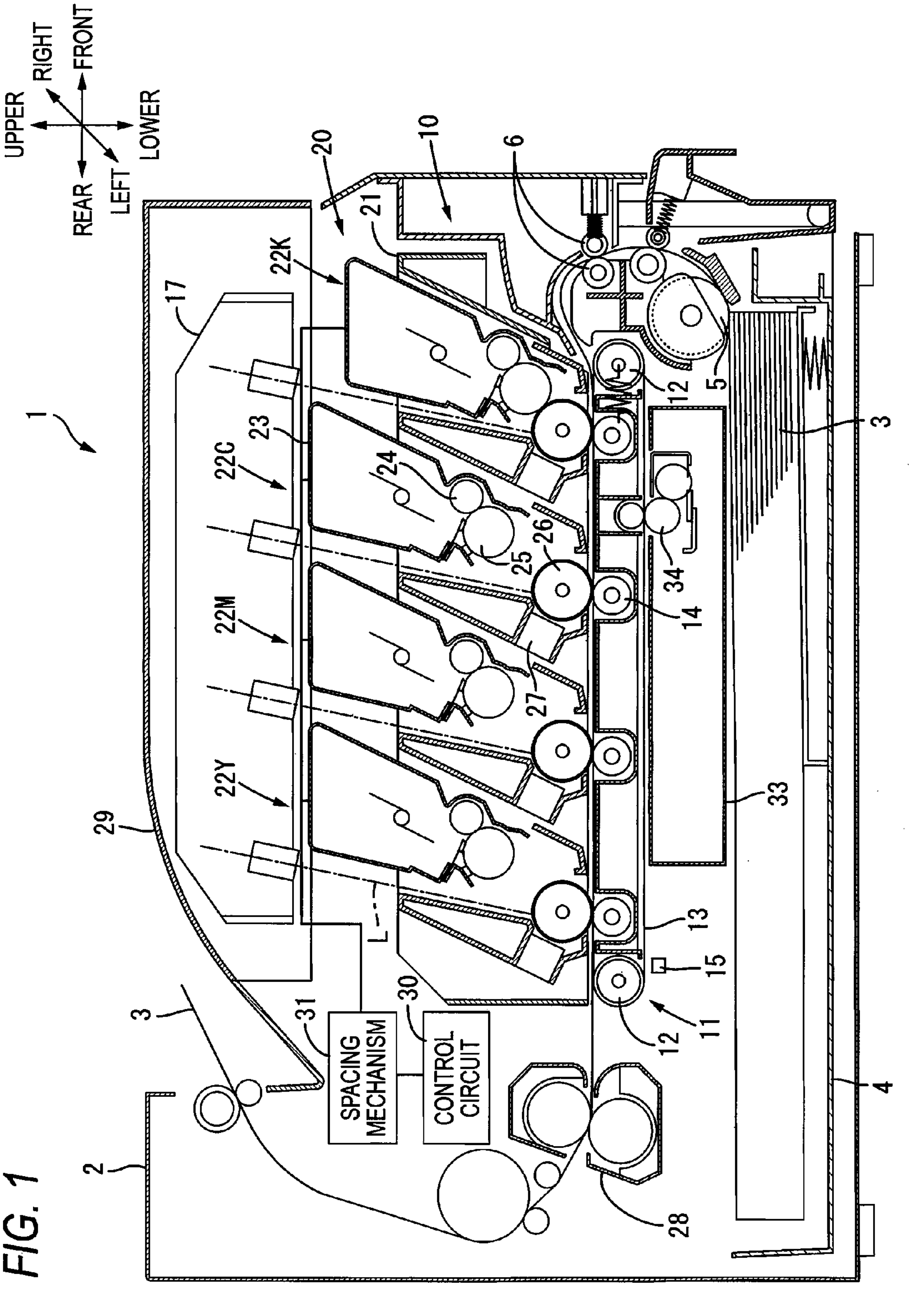
FIG. 1 is a side sectional view showing a general configuration of a printer according to an exemplary embodiment of the present invention.

FIG. 1 is a side cross-sectional view showing a general configuration of a printer 1. Hereinafter, a forward direction corresponds to a right side in FIG. 1.

The printer 1 has a body casing 2, and a feed tray 4 provided at the lower portion of the body casing 2. Sheets 3 (e.g., a paper), which are recording media, are loaded on the feed tray 4. A pickup roller 5 provided upper to the front end of the feed tray 4, and the sheet 3 loaded at the top of the feed tray 4 is delivered out to a register roller 6 with the rotation of the pickup roller 5. The register roller 6 performs inclination correction of the sheet 3, and then conveys the sheet 3 to a belt unit 11 provided at a print section 10 (an example of a "forming section" of the present invention).

The print section 10 includes the belt unit 11, a scanner section 17, a process section 20, a fixing section 28, etc.

The belt unit 11 is configured by a circular shaped belt 13, which is made of, for example, polycarbonate, looping around a pairs of support rollers 12 and 12. The sheet 3 is conveyed backwards on the belt 13 by the operation of the belt 13. In the inner side of the loop formed by the belt 13, transfer rollers 14 are provided. The transfer rollers 14 respectively face one of photosensitive drums 26 with the belt 13 therebetween. The photosensitive drums 26 belong to the process section 20, which will be described later. Further, a sensor 15 is provided, facing the surface of the belt 13, to detect a test pattern formed on the belt 13.

The scanner section 17 irradiates laser light L for each color, which is emitted from a laser emitting section (not shown), on the surface of the corresponding photosensitive drum 26.

The process section 20 includes a frame 21 and, for example, four developing cartridges 22 (that is, 22Y, 22M, 22C, and 22K, which are examples of a "unit forming section") corresponding to four colors (yellow, magenta, cyan, and black), which are detachably provided to the frame 21. Each developing cartridge 22 includes a toner containing chamber 23, which is used for accommodating toner (an example of a colorant) of each color as a developer, a supply roller 24, and a developing roller 25. The frame 21 includes a photosensitive drum 26 and an electric charger 27 of the scorotron type, corresponding to each developing cartridge 22.

The toner discharged from the toner containing chamber 23 is supplied to the developing roller 25 by the rotation of the supply roller 24, and, at the same time, the toner is positively charged by a frictional force between the supply roller 24 and the developing roller 25. A surface of the photosensitive drum 26 is first positively charged by the electric charger 27 while rotating, and is then exposed to a laser light L from the scanner section 17, allowing an electrostatic latent image, which corresponds to an image to be formed on the sheet 3, to be formed.

Then, the rotation of the developing roller 25 allows the toner on the developing roller 25 to be supplied to the surface of the photosensitive drum 26, thereby making the electrostatic latent image a visible image. After that, the toner image carried on the surface of the photosensitive drum 26 is transformed on the sheet 3 by the transformation bias voltage applied to the transfer roller 14, as the sheet 3 moves between the photosensitive drum 26 and the transfer roller 14.

After the transformation, the belt unit 11 conveys the sheet 3 to the fixing section 28, and the toner image transformed on the sheet 3 is thermally fixed at the fixing section 28. Then, the thermally fixed sheet 3 is discharged to a discharging tray 29 provided at an upper surface of the body casing 2.

The body casing 2 is provided with a control circuit 30 and a spacing mechanism 31 (an example of a "displacing mechanism" of the present invention). The control circuit 30 controls the general movement of the printer 1. The spacing mechanism 31 is controlled by the control circuit 30. In case of monochrome (black-and-white) printing, for example, the spacing mechanism 31 performs a separating operation by shifting upwards three developing cartridges 22 corresponding to three colors (e.g., cyan, magenta and yellow, other than black), and displacing each developing roller 25 (an example of "at least one element of the unit forming section" in the present invention) to a position apart from each photosensitive drum 26 (an example of the "idle position" of the present invention). Specific configuration of the spacing mechanism 31 is described in, for example, the following documents (U.S. Pat. No. 7,555,245, U.S. Pat. No. 7,787,805, U.S. Pat. No. 7,885,574, U.S. Pat. No. 7,869,742).

A cleaning unit 33 provided lower to the belt unit 11. The cleaning unit 33 has a cleaning roller 34 in contact with the belt 13 to collect the toner (including a test pattern for measuring positional deviation as described below) remaining on the belt 13. The spacing mechanism 31 shifts all developing cartridges 22 corresponding to black, cyan, magenta and yellow and performs the separating operation by which each developing roller 25 is moved apart from each photosensitive drum 26, upon the cleaning operation of the cleaning unit 33.

(Electronic Configuration of Print System)

Figure 2:
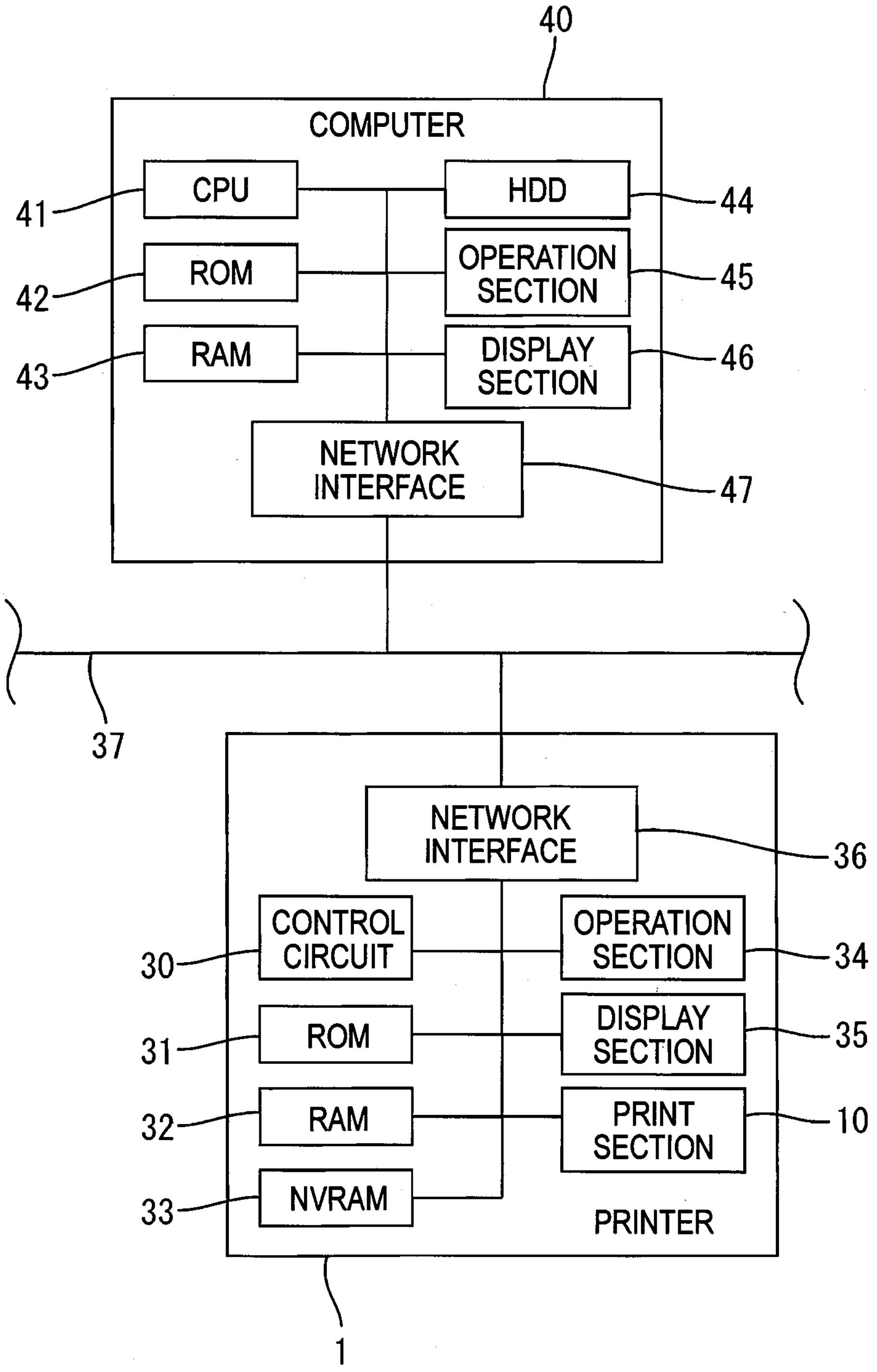
FIG. 2 is a block diagram showing an electronic configuration of an image forming system.

FIG. 2 is a block diagram showing an electronic configuration of the print system including the printer 1 and one or a plurality of computers 40 (an example of the "information processing apparatus" of the present invention) connected to the printer 1 via a communication line 37.

The printer 1 includes, the control circuit 30 (an example of a "correction section", a "determination section", and a "control section" in the present invention), a Read Only Memory (ROM) 31, a Random Access Memory (RAM) 32, a Nonvolatile RAM (NVRAM) 33, an operation section 34, a display section 35, the print section 10 as described above, a network interface 36, etc.

The ROM 31 stores several programs to control the operation of the printer 1, such as a job execution process as described below. The control circuit 30 controls the operation of the printer in response to the program acquired from the ROM 31, while storing the process result in the RAM 32 or the NVRAM 33. The control circuit 30 may be configured by a general purpose computer or by an Application Specific Integrated Circuits (ASIC).

The operation section 34 has a plurality of buttons, by which a user can perform several input operations such as a print instruction. The display section 35 includes a liquid crystal display or a lamp, and may display several setup screens or operational conditions. The network interface 36 is connected to, for example, an external computer 40 via a communication line 37, thereby allowing the data communication between them.

The computer 40 includes a Central Processing Unit (CPU) 41, ROM 42, RAM 43, a hard disk 44, an operation section 45 having a keyboard or pointing device, a display section 46 having a liquid crystal display, and a network interface 47 connecting to the communication line 37. The hard disk 44 stores several programs such as printer driver or application software for forming data for printing.

(Print Data Transmission Process)

Figure 3:
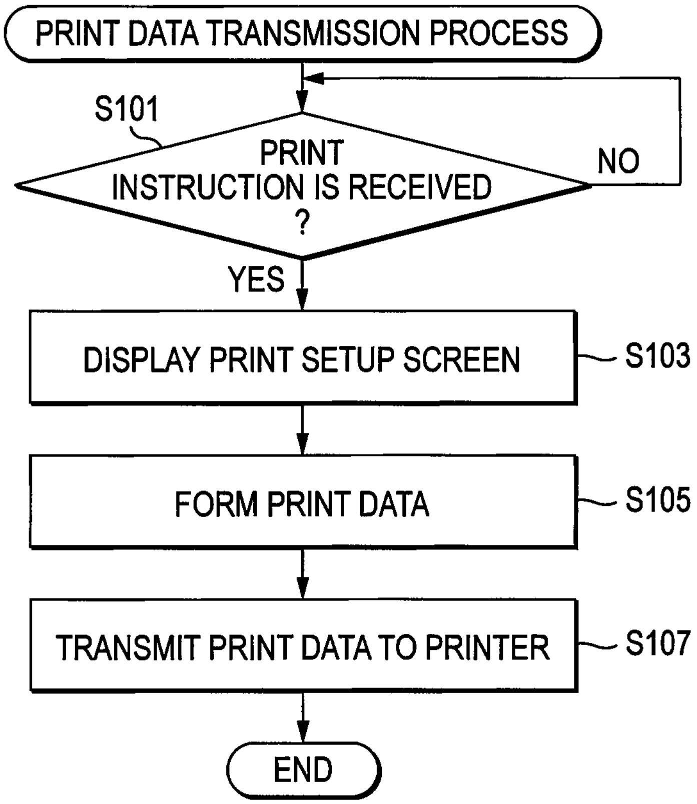
FIG. 3 is a flowchart showing a print data transmission process.

FIG. 3 is a flowchart showing the flow of a print data transmission process performed by the CPU 41 in the computer 40.

When a user inputs a print instruction by the operation section 45 of the computer 40, the CPU 41 forms the data for printing with the application software, and begins the print data transmission process by the printer driver. In the printer driver, as shown in FIG. 3, when the print instruction is received (S101: YES), a print setup screen (not shown) is displayed in the display section 46 (S103). The user may specify several print setups such as a print size, resolution, a kind of sheets, and the number of colors on the print setup screen. The number of colors may be selectively specified from a "monochrome mode", a "color mode" (an example of a "first mode" in the present invention) and an "automatic mode" (an example of a "second mode" in the present invention).

Here, the "monochrome mode" is a mode in which an image is formed by a monochrome regardless of whether a page is shown in colors in the application. The image is formed after the developing roller 25 corresponding to the color that is not in use is moved apart from the photosensitive drum 26.

The "color mode" is a mode in which an image is formed by bringing the development rollers 25 for all colors in contact with the photosensitive drums 26 regardless of whether a page is shown in a monochrome in the application.

The "automatic mode" is a mode in which an image is formed after the development roller 25 for the color not in use is moved apart from the photosensitive drum 26 for a page which is shown in a monochrome in the application, and in which an image is formed by bringing the development roller 25 for the corresponding color into contact with the photosensitive drum 26 for other pages (e.g., a page shown in color).

When a user specifies, and confirms, each print setup by using the operation section 45, the CPU 41 creates print data by converting the data formed by the application software into a PDL (page description language) (S105). Meanwhile, expanded data (e.g., bitmap data) may be created from data for printing in the computer 40, and may be transmitted to the printer 1 as print data upon printing.

Such print data includes, for example, a header and a print data body (image data). The header includes the IP address of the computer 40 itself, which is the source of transmission, and the IP address of the printer 1, which is the destination of the transmission. The header additionally includes several kinds of information such as a time and date of a print request, user information, a document name, an application name, a type of data, the several print setups, etc. When the print data is formed, the CPU 41 transmits a print job (an example of a "print request" in the present invention) including the print data to the printer 1 via the network interface 47 (S107). After that, the print data transmission process is terminated.

(Job Execution Process)

Figure 4:
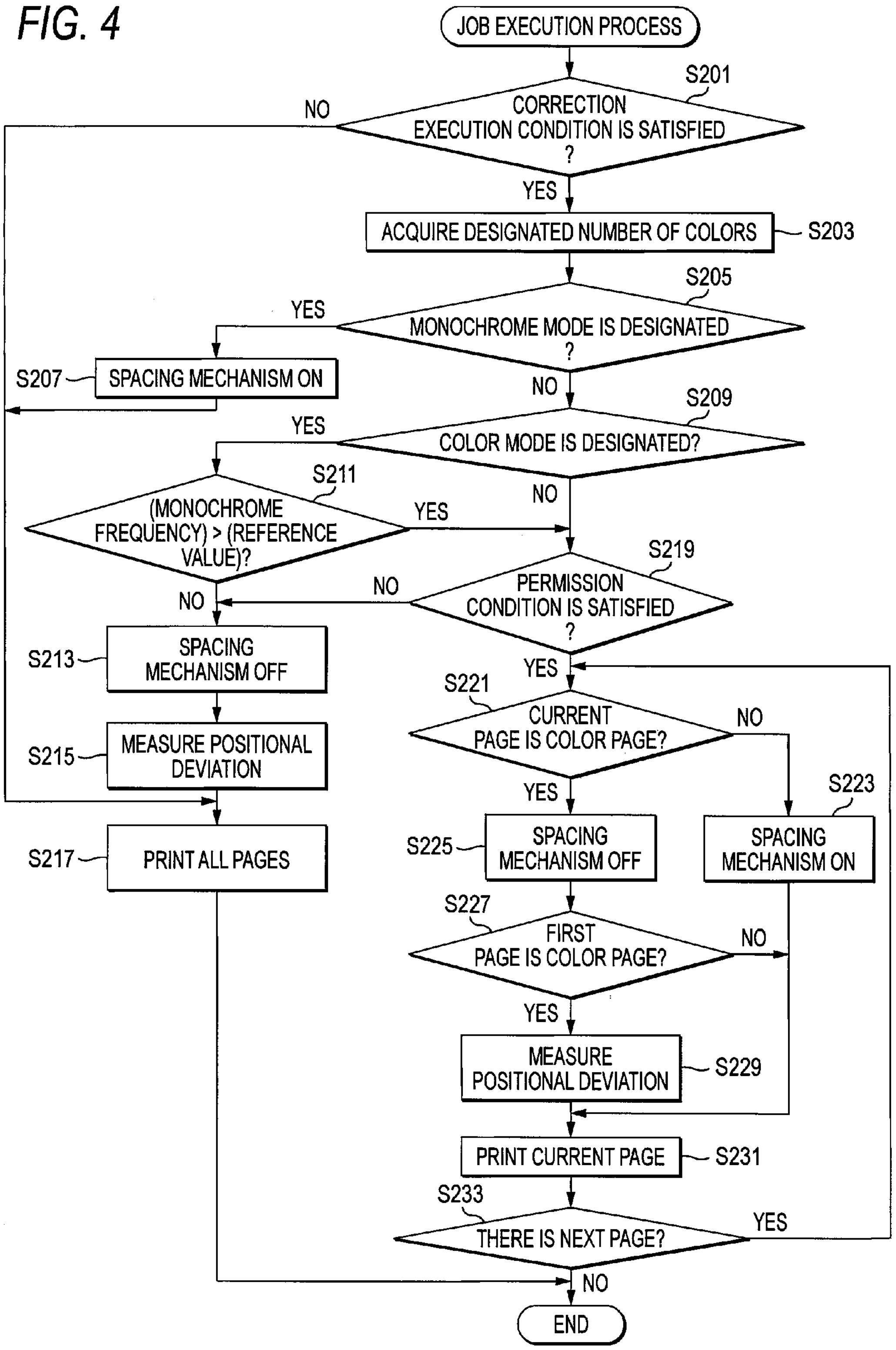
FIG. 4 is a flowchart showing a job execution process.

FIG. 4 is a flowchart showing the job execution process performed by the control circuit 30 in the printer 1. When the print job transmitted from, for example, the computer 40 is received by the network interface 47, the control circuit 30 registers that print job in a print queue. The print queue may register a plurality of print jobs. The control circuit 30 performs the job execution process in as shown in FIG. 4 with respect to each print job registered in the print queue in series.

The control circuit 30 first determines whether a predetermined correction execution condition is satisfied (S201). The correction execution condition is a condition to determine whether or not the execution of positional deviation correction (an example of a "correction function" in the present invention) is necessary (or preferable) to ensure image quality. Specifically, the examples of the correction execution condition are, a period of time elapsed from the execution of measurement of positional deviation for the previous positional deviation correction, a rotational frequency of the photosensitive drum 26, a temperature variation is equal to or above a reference value, or an input operation of a correction instruction by a user via the operation section 34.

If the correction execution condition is not satisfied (S201: NO), the control circuit 30 performs, with respect to the print job currently being processed (hereinafter, the "current job"), expansion processes for every page based on several print setup information which is included in the current job. Then, the control circuit 30 delivers the expanded data (bitmap data) to the print section 10, and prints on the sheet 3 an image based on the expanded data. When the printing is performed for all pages included in the current job (S217), the job execution process to the current job is terminated.

Meanwhile, if the correction execution condition is satisfied (S201: YES; an example of "there is a print request while a correction execution condition satisfied" in the present invention), the control circuit 30 acquires, from the header of the current job, the number of colors specified by a user (S203).

(1) Monochrome Mode

When the control circuit 30 determines that the monochrome mode is designated based on specified information (S205: YES), the control circuit 30 turns the spacing mechanism 31 on, thereby moving the development rollers 35 for three colors that are not used for printing apart from the respective photosensitive drums 26 (S207). For example, if it is a black-and-white page, three development rollers 25 each corresponding to cyan, magenta and yellow become idle. In this case, applying developing bias to these three development rollers 25 may also be turned off. Then, black-and-white printing is executed for all pages of a current job (S217), and then the job execution process is terminated.

(2) Color Mode

When the control circuit 30 determines that the color mode is designated (S205: NO and S209: YES), the control circuit 30 determines whether a monochrome frequency is higher than a reference value (e.g., 50%) (S211). The monochrome frequency is, for example, the proportion of the print jobs including only print data of monochrome pages (e.g., black-and-white pages) to the print jobs in which the color mode is designated.

Whenever the color mode is performed, the control circuit 30 determines whether the print job only includes monochrome pages, based on, for example, the result of the expansion process of the print data, and then calculates the monochrome frequency based on the result of the determination, and stores latest information of the calculation to, for example, the NVRAM 33. If the monochrome frequency is equal to or smaller than the reference value (S211: NO), the spacing mechanism 31 is turned off. Here, each development roller 25 for every color is arranged in a position in contact with each photosensitive drum 26 (i.e., at the operable position) and becomes operable.

Then, positional deviation is measured (S215) before the printing process of the current job is performed. When measuring the positional deviation, a test pattern for each color is printed on the belt 13, and the position of the test pattern is detected by the sensor 15. Based on the result of the detection, for example, the amount of positional deviation of other colors with respect to black (the color deviation amount) is measured.

After that, the control circuit 30 performs color printing for all pages (S217), regardless of whether color pages are included or not, with the spacing mechanism 31 off, while adjusting, for example, an exposure timing (i.e., exposure position with respect to the photosensitive drum 26) by the scanner section 17 based on the measurement of the positional deviation so as to reduce the positional deviation. Then, the job execution process is terminated.

If the monochrome frequency is higher than the reference value (S211: YES), the process goes on to S219 without executing the color mode, and the automatic mode is executed as described below.

(3) Automatic Mode

In S219, the control circuit 30 determines whether a permission condition is satisfied or not (S219). The permission condition is a condition where the automatic mode is allowed to be executed. The permission condition is stored in advance, for example, in the NVRAM 33. The permission condition may include, for example, a situation where a user (e.g., a manager of the printer 1) performs a setup operation allowing the execution of the automatic mode via the operation section 34. If the control circuit 30 determines that the permission condition is not satisfied (S219: NO), the control circuit 30 goes to S213 and performs the color mode.

If the control circuit 30 determines that the permission condition is satisfied (S219: YES), the control circuit 30 determines whether a page of the current job being currently printed (hereinafter, also referred to as the "current page") is a color page (S221). A color page means a page to be printed with a plurality of colors among black, yellow, magenta and cyan toners. In contrast, a monochrome page means a page printed with a single color. Meanwhile, a page printed with a single color other than black may be identified as a color page, rather than a monochrome page. Whether a page is a color page may be determined from the result of the expansion process of the print data of the current page. When the header includes, for example, information indicating color page, the above determination may be performed without performing the expansion process.

If current page is a monochrome page (S221: NO), the printing result is not influenced by the color deviation. Thus, the control circuit 30 does not perform the measurement of positional deviation, and moves the development rollers 25 corresponding to three colors, which are not in use for printing the current page, apart from the photosensitive drums 26 (S223), thereby making those development rollers 25 idle. The control circuit 30 only operates the development roller 25 for one color used for printing the current page, by making the roller 25 in contact with the photosensitive drum 26. After monochrome printing is performed for the current page (S231), if there is a next page (unprinted page) with respect to the current job (S233: YES), the process returns to S221. If there is no next page (S233: NO), the job execution process is terminated.

If the current page is a color page (S221: YES), the control circuit 30 brings the development rollers 25 for all colors into contact with the photosensitive drums 26 by turning the spacing mechanism 31 off (S225). Further, if the current page is a first color page during the current job (S227: YES), the control circuit 30 measures the positional deviation as in S215 (S229), and performs color printing (S231) while adjusting, for example, the exposure timing by the scanner section 17, based on the latest measurement. After that, the process proceeds to S233.

On the other hand, if the current page is not the first color page during the current operation (S227: NO), the control circuit 30 performs, without the measurement of positional deviation, color printing (S231) based on the result of the positional deviation measurement stored in advance in the NVRAM 33, while adjusting, for example, the exposure timing by the scanner section 17. After that, the process goes on to S233.

Specific Example

FIGS. 5 to 8 are time charts showing the printing process for each page, the measurement of positional deviation, and the on-and-off of the spacing mechanism 31.

(1) First Example

Figure 5:
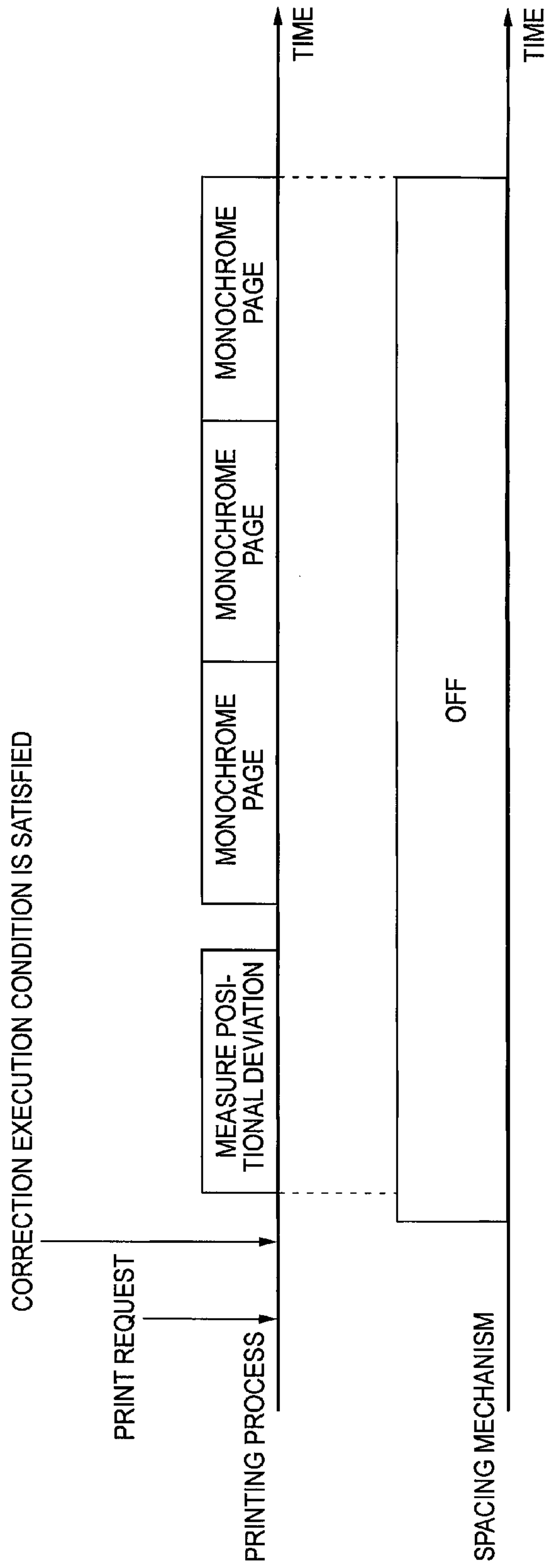
FIG. 5 is a time chart showing a printing process for each page, a measurement of positional deviation, and an on-and-off of a spacing mechanism (Example 1)

FIG. 5 shows a first example in which the color mode is executed with respect to the printing process for three monochrome pages in total. In this case, after the correction execution condition is satisfied, the spacing mechanism 31 is turned off. Then, the positional deviation is measured. Then, the printing process is performed for all of the three pages with the spacing mechanism 31 turned off. In other words, in the first example, the measurement of the positional deviation is performed before the printing process although the printing process is performed only with respect to monochrome pages for which necessity of the correction of positional deviation is low.

(2) Second Example

Figure 6:
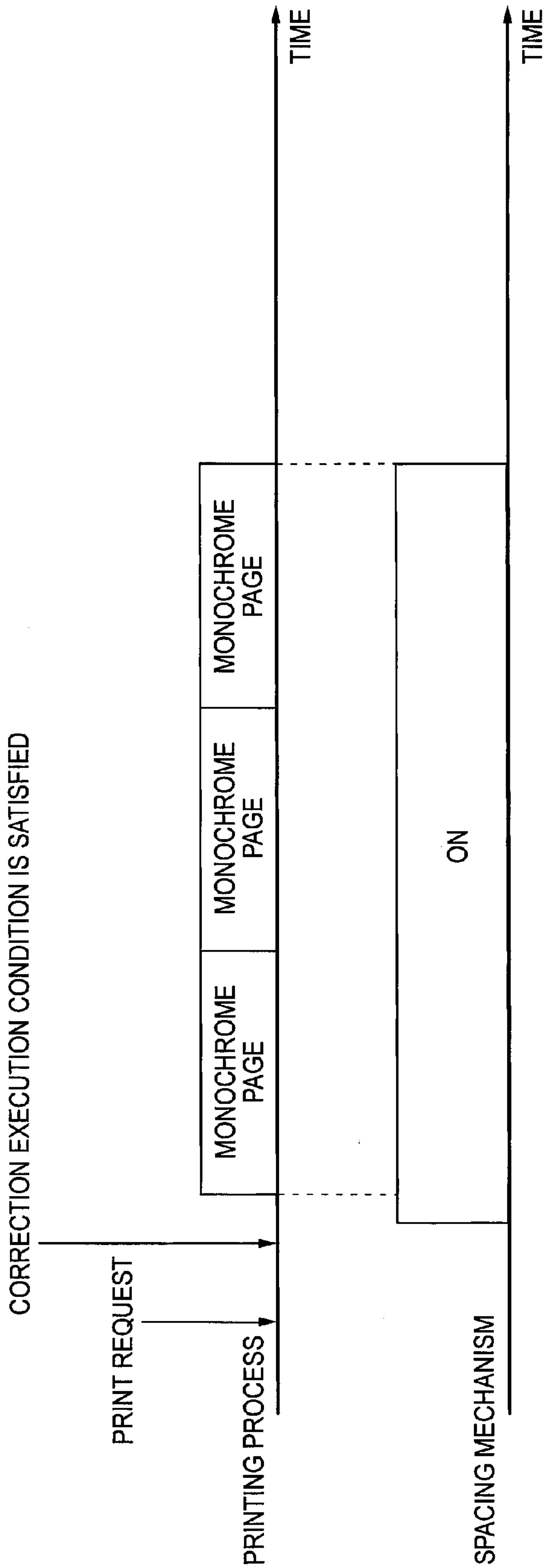
FIG. 6 is a time chart showing the printing process for each page, the measurement of positional deviation, and the on-and-off of the spacing mechanism (Example 2)

FIG. 6 shows a second example in which the automatic mode is executed with respect to the printing process for three monochrome pages in total. In this case, after the correction execution condition is satisfied, the printing process is performed for the three pages with the spacing mechanism 31 turned on, without any measurement of positional deviation. Therefore, the printing process can be started earlier than that in the first example to the extent of the period where the measurement of positional deviation is not performed. Moreover, it is possible to prevent the unnecessary measuring of positional deviation. Furthermore, because the development rollers 25 become apart from the photosensitive drums 26, the deterioration of the development rollers 25 may be prohibited.

(3) Third Example

Figure 7:
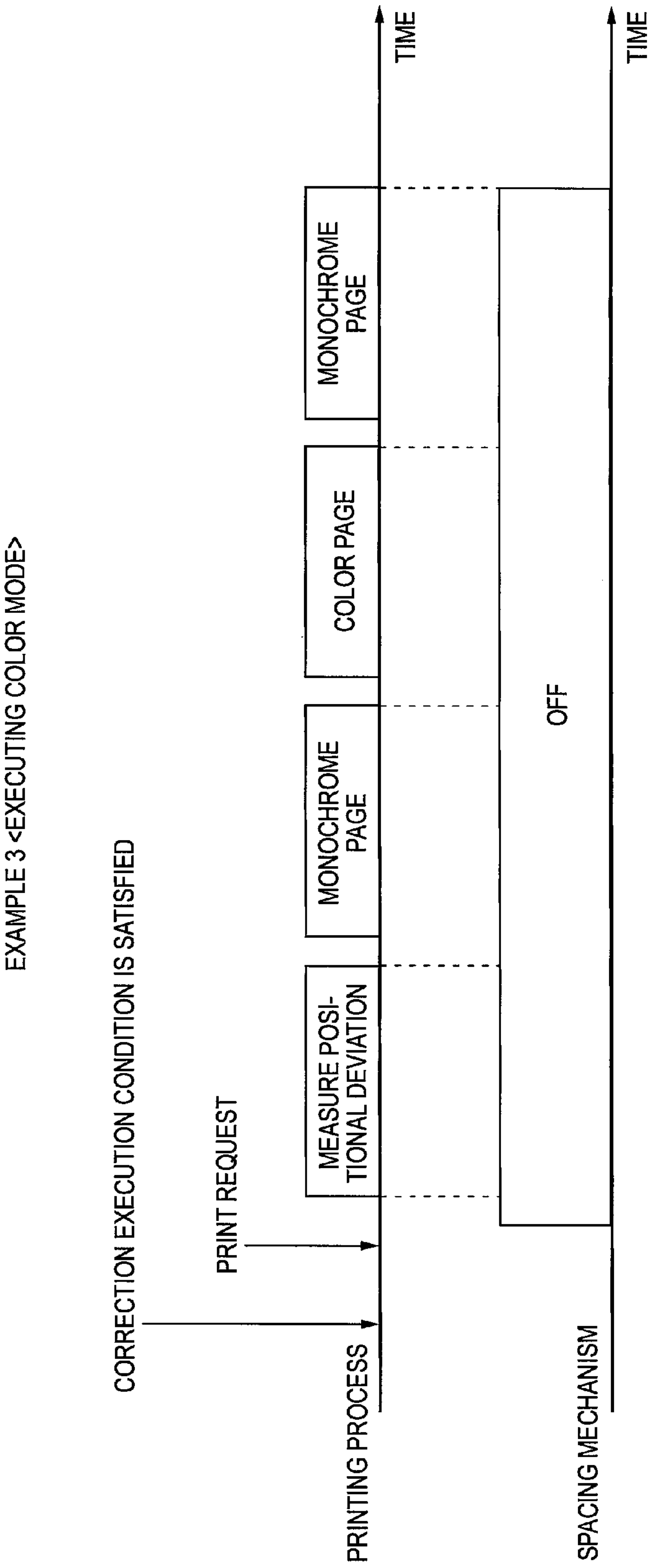
FIG. 7 is a time chart showing the printing process for each page, the measurement of positional deviation, and the on-and-off of the spacing mechanism (Example 3)

FIG. 7 shows a third example in which the color mode is executed with respect to the printing process for three pages in total consisting of a monochrome page, a color page and a monochrome page. In this case, when there is a print request, the spacing mechanism 31 is turned off. Then, the positional deviation is measured. Then, the printing process is performed with respect to the three pages with the spacing mechanism 31 turned off. Because the measurement of positional deviation is performed prior to the printing process of the printing job, the measurement of positional deviation being performed during the printing process of the printing job, which causes the difference in color tone between the pages before and after the measurement of positional deviation, can be prevented.

(4) Fourth Example

Figure 8:
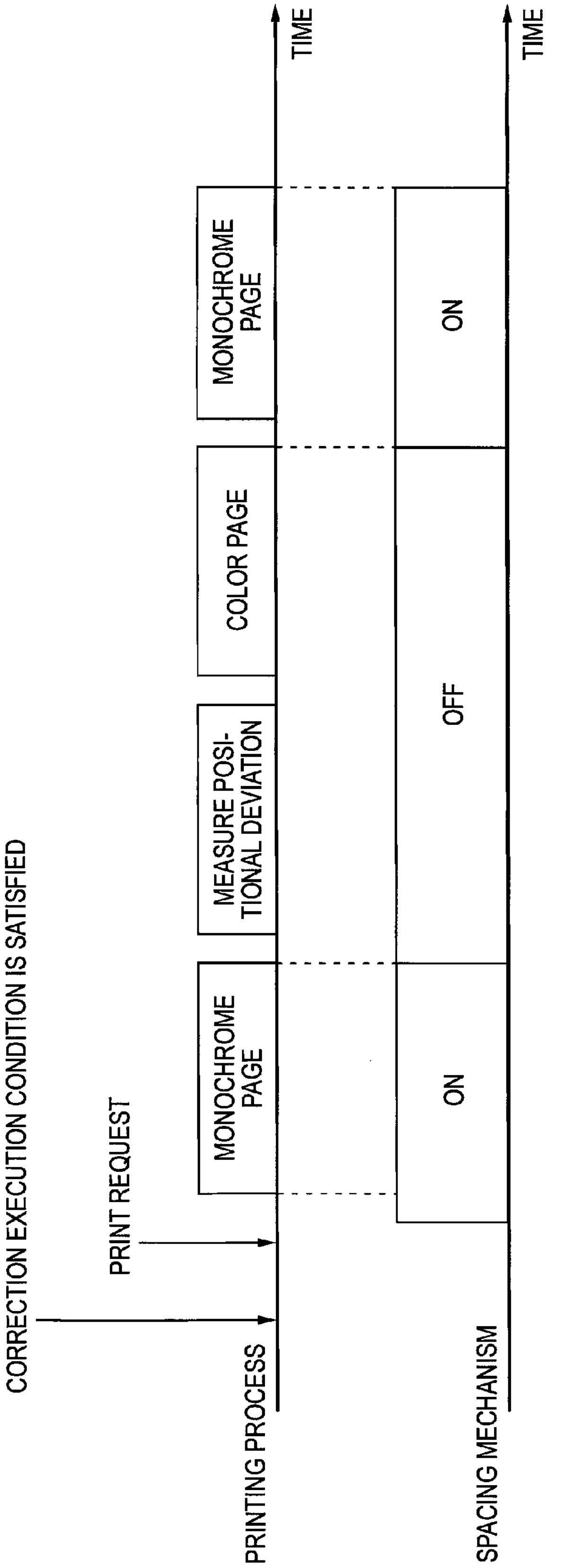
FIG. 8 is a time chart showing the printing process for each page, the measurement of positional deviation, and the on-and-off of the spacing mechanism (Example 4).

FIG. 8 shows a fourth example in which the automatic mode is executed with respect to the printing process for three pages in total consisting of a monochrome page, a color page and a monochrome page, as in the third example. In this case, when there is a print request, the printing process is performed for the first monochrome page by turning the spacing mechanism 31 on. Then, positional deviation is measured with the spacing mechanism 31 turned off, and the printing process is performed for the color page. After that, the spacing mechanism 31 is turned on again, and the printing process is executed for the second monochrome page. When the monochrome pages are in the printing process, the deterioration of the development rollers 25 may be prevented because the development rollers 25 move apart from the photosensitive drums 26. However, the printing process may become slower than in the third example because the spacing mechanism 31 is frequently turned on and off.

(Technical Effects of the Exemplary Embodiment)

According to the present exemplary embodiment, the color mode or the automatic mode may be selectively preformed when there is a print request while a correction execution condition is satisfied. In the color mode, the measurement of positional deviation is performed prior to the printing process based on the print request. Thus, any change in, for example, the color tone of a printout during printing process caused by adjusting the exposure timing based on the correction of positional deviation during the printing process, may be prevented. In the automatic mode, if the print data includes color page data, the measurement of positional deviation is performed no later than the printing process with respect to the color page data. Therefore, the unnecessary measurement of positional deviation being performed, when the print data does not include color page data, may be prohibited. As such, the convenience in the correction of positional deviation may be enhanced by using both modes selectively based on each merit.

Furthermore, when the printing process is performed to the monochrome page data, a development roller 25 of at least one developing cartridge 22 operates in the color mode but does not operate in the automatic mode. Therefore, high-speed printing may be achieved in the color mode because the load in switching the development roller 25 between its operable and idle positions may be reduced. Meanwhile, the wear-out or deterioration of an element which is not in operation may be suppressed in the automatic mode. Accordingly, by using both modes selectively in further consideration of these merits, the convenience in the correction of positional deviation may be further improved.

Furthermore, in the printing process with respect to monochrome page data, the development roller 25 corresponding to an unused color is moved apart from the photosensitive drum 26, and thus the wear-out or deterioration of such development roller 25 may be effectively suppressed. Accordingly, the automatic mode has further merits, and the convenience in the correction of positional deviation may be improved.

Furthermore, on the condition that the frequency at which the printing process only for monochrome pages is executed, although the color mode is selected by a user, is higher than a reference value, the automatic mode suitable for such condition is automatically selected. Therefore, the convenience in the correction of positional deviation may be further enhanced.

Other Exemplary Embodiments

The present invention is not limited to the exemplary embodiment described above with reference to the accompanying drawings, and for example, other exemplary embodiments described hereinafter may also fall within the technical scope of the present invention.

(1) Although the above-described exemplary embodiment adopts the correction of positional deviation as the correction function, the present invention also includes adopting a density correction as the correction function. The density correction may be performed, for example, based on a measurement of a density of a test pattern, (density patch) which is printed on the belt, by a sensor. Moreover, other than adjusting the exposure timing as described in the exemplary embodiment, the image forming condition can be adjusted by, for example, adjusting the density in an image, adjusting (e.g., deteriorating) the image resolution, and adjusting the voltage applied to the development rollers 25 or the transfer rollers 14.

(2) Although the above-described exemplary embodiment describes a color laser printer of a direct transformation type as an image forming apparatus, the present invention may be applied to a laser printer of an intermediate transformation type or to an inkjet printer.

(3) Although the above-described exemplary embodiment describes the spacing mechanism 31 performing a spacing operation by which each development roller 25 is moved apart from each photosensitive drum 26, the displacing mechanism of the present invention is not limited to this configuration. The displacing mechanism may be a mechanism that separates the photosensitive drum 26 from the belt 13, a mechanism that separates the transfer roller 14 from the belt 13, or a mechanism that performs at least two operations among the above-described mechanisms and the spacing mechanism 31. Alternatively, instead of providing a displacing mechanism, the voltage that is applied to the development roller 25, the transfer roller 14, and the electronic charger 27, may be turned on or off.

(4) Although a user selects (determines) one of the color mode and the automatic mode to be executed in the above-described exemplary embodiment, the present invention is not limited to this configuration. For example, the control circuit 30 may determine whether the proportion of color pages included in the current job is higher than a particular reference value, and automatically select the color mode if the proportion is higher than the reference value or the automatic mode if the proportion is lower than the reference value.

(5) In the above-described exemplary embodiment, in the automatic mode, although the measurement of positional deviation is performed shortly before the printing process of the first color page, the present invention is not limited to this configuration. For example, the measurement of positional deviation may be performed before the printing process to a monochrome page which comes two or three pages prior to the first color page. For example, whether a first color page exists may be determined by the expansion process, while suspending the print process for the first page. If the first color page exists, the printing process from the first page may be performed after the measurement of the positional deviation is performed.

(6) As an alternative to the above-described exemplary embodiment, the CPU 41 of the computer 40 may execute, for example, the process corresponding to the determination as to whether the current job includes a color page (S221 of FIG. 4), or the control process selectively instructing the color mode or the automatic mode to the printer 1.

The present invention provides illustrative, non-limiting aspects as follows:

(1) According to a first aspect, there is provided an image forming apparatus comprising: a forming section configured to form a color image; a correction section configured to measure at least one of a position and a density of an image formed by the forming section and perform a correction function for adjusting an image forming condition based on the measurement; a determination section configured to determine whether a color condition is satisfied, the color condition being satisfied if print data, which is an object of a print request, includes color page data; and a control section configured to selectively perform a first mode or a second mode if there is a print request while a correction execution condition satisfied, wherein in the first mode, the correction section is caused to perform the correction function, before a printing process begins in response to the print request, and wherein in the second mode, the correction section is caused to perform the correction function at least before the printing process to the color page data, on condition that the determination section determines that the color condition is satisfied.

According to this configuration, the first mode or the second mode may be selectively preformed when there is a print request while the correction execution condition is satisfied. In the first mode, the correction function is performed prior to the printing process based on the print request. Thus, any change in, for example, a color tone of a printout during the printing process based on an adjustment of the image forming condition during the printing process, may be prevented. Meanwhile, in the second mode, if the print data includes color page data, the correction function is performed no later than the printing process with respect to the color page data. Therefore, an unnecessary correction function being performed, when the print data does not include color page data, may be prohibited. As such, the convenience in the correction function may be enhanced by using both modes selectively based on each merit.

(2) According to a second aspect, there is provided the image forming apparatus according to the first aspect, wherein the forming section comprises a plurality of unit forming sections corresponding to different colors respectively, wherein each of the plurality of unit forming sections has at least one element operable when an image for the corresponding color is formed, and wherein the at least one element of at least one unit forming section of the plurality of unit forming sections operates in the first mode but does not operate in the second mode, when the printing process is performed with respect to monochrome page data.

According to this configuration, when the printing process is performed to the monochrome page data, the at least one element of the at least one unit forming section operates in the first mode but does not operate in the second mode. Therefore, in the first mode, the load in switching between operable and idle positions may be reduced. Meanwhile, in the second mode, wear-out or deterioration of an element which is not in operation may be suppressed. Accordingly, by using both modes selectively in further consideration of these merits, the convenience in the correction function may be further improved.

(3) According to a third aspect, there is provided the image forming apparatus according to the second aspect, further comprising a displacing mechanism configured to displace the at least one element of the at least one unit forming section into an idle position in the second mode.

According to this configuration, in the printing process with respect to the monochrome page data, the unused element is displaced to the idle position, and thus the wear-out or deterioration of such element may be effectively suppressed. Accordingly, the second mode has further merits, and the convenience in the correction function may be improved.

(4) According to a fourth aspect, there is provided the image forming apparatus according to any one of the first to third aspects, wherein the control section measures a frequency at which the printing process is performed only for monochrome pages when the first mode is selected, and on condition that the frequency is higher than a reference frequency, the control section does not select the first mode and selects the second mode.

According to this configuration, on the condition that the frequency at which the printing process only for monochrome pages is executed is higher than a reference value although the first mode is selected, the second mode suitable for such condition is automatically selected. Therefore, the convenience in the correction function may be further enhanced.

(5) According to a fifth aspect, there is provided the image forming apparatus according to one of the first to fourth aspects, wherein the control section makes the second mode inexecutable if a permission condition is not satisfied, and makes the second mode executable if the permission condition is satisfied.

According to this configuration, the second mode may become inexecutable or executable based on whether the permission condition is satisfied. Therefore, the convenience in the correction function may be further improved.

(6) According to a sixth aspect, there is provided an image forming system including an image forming apparatus and an information processing apparatus communicating with the image forming apparatus, the image forming system comprising: a forming section provided to the image forming apparatus and is configured to form a color image, a correction section configured to measure at least one of a position and a density of an image formed by the forming section and perform a correction function for adjusting an image forming condition based on the measurement, a determination section configured to determine whether a color condition is satisfied, the color condition being satisfied if print data, which is an object of a print request, includes color page data, and a control section configured to selectively perform a first mode or a second mode if there is a print request while a correction execution condition satisfied, wherein in the first mode, the correction section is caused to perform the correction function, before a printing process begins in response to the print request, and wherein in the second mode, the correction section is caused to perform the correction function at least before the printing process to the color page data, on condition that the determination section determines that the color condition is satisfied.

(7) According to a seventh aspect, there is provided a computer readable recording medium storing a computer program for causing a computer of an information processing apparatus, which communicates with an image forming apparatus configured to form a color image, measure at least one of a position and a density of a formed image and perform a correction function for adjusting an image forming condition based on the measurement, to perform a method of: determining whether a color condition is satisfied, the color condition being satisfied if print data, which is an object of a print request, includes color page data, and selectively instructing a first mode or a second mode to the image forming apparatus if there is a print request while a correction execution condition satisfied, wherein in the first mode, the correction function is caused to be performed before a printing process begins in response to the print request, and wherein in the second mode, the correction function is caused to be performed at least before the printing process to the color page data, on condition that it is determined that the color condition is satisfied.

(8) According to an eighth aspect, there is provided a computer readable recording medium storing a computer program for causing a computer of an image forming apparatus, which includes a forming section configured to form a color image, to perform a method of: measuring at least one of a position and a density of an image formed by the forming section and perform a correction function for adjusting an image forming condition based on the measurement; determining whether a color condition is satisfied, the color condition being satisfied if print data, which is an object of a print request, includes color page data; and selectively performing a first mode or a second mode if there is a print request while a correction execution condition satisfied, wherein in the first mode, the correction function is caused to be performed before a printing process begins in response to the print request, and wherein in the second mode, the correction function is caused to be performed at least before the printing process to the color page data, on condition that it is determined that the color condition is satisfied.

Accordingly, it is possible to improve the convenience in a correction function.

The invention claimed is:

1. An image forming apparatus comprising:

a forming section configured to form a color image;

a processor; and memory storing instructions that, when executed by the processor, cause the image forming apparatus to function as:

a correction section configured to measure at least one of a position and a density of a test pattern formed by the forming section and perform a correction function for adjusting an image forming condition based on the measurement;

a determination section configured to determine whether a color condition is satisfied, the color condition being satisfied if print data, which is an object of a print request, includes color page data; and a control section configured to selectively perform a first mode or a second mode when the print request is received and a correction execution condition is satisfied, wherein, in the first mode, the forming section is caused to print the test pattern and the correction section is caused to perform the correction function, before a printing process begins in response to the print request, and wherein, in the second mode, the forming section is caused to form the test pattern and the correction section is caused to perform the correction function after the printing process has begun in response to the print request and at least before a printing process for the color page data begins, on condition that the determination section determines that the color condition is satisfied, whereas the forming section is not caused to form the test pattern and the correction section is not caused to perform the correction function, in the second mode, if the determination section determines that the color condition is not satisfied.

2. The image forming apparatus according to claim 1, wherein the forming section comprises a plurality of unit forming sections corresponding to different colors, respectively, wherein each of the plurality of unit forming sections has at least one element operable when an image for the corresponding color is formed, and wherein the at least one element of at least one unit forming section of the plurality of unit forming sections is configured to operate in the first mode but is configured to not operate in the second mode, when the printing process is performed with respect to monochrome page data.

3. The image forming apparatus according to claim 2, further comprising a displacing mechanism configured to displace the at least one element of the at least one unit forming section into an idle position in the second mode.

4. The image forming apparatus according to claim 1, wherein the control section is further configured to measure a frequency at which the printing process is performed only for monochrome pages when the first mode is selected, and wherein, on condition that the frequency is higher than a reference frequency, the control section is configured to not select the first mode and to select the second mode.

5. The image forming apparatus according to claim 1, wherein the control section is further configured to make the second mode non-executable if a permission condition is not satisfied, and to make the second mode executable if the permission condition is satisfied.

6. An image forming system including an image forming apparatus and an information processing apparatus configured to communicate with the image forming apparatus, the image forming system further comprising:

a forming section provided to the image forming apparatus and is configured to form a color image, a correction section configured to measure at least one of a position and a density of a test pattern formed by the forming section and perform a correction function for adjusting an image forming condition based on the measurement, a determination section configured to determine whether a color condition is satisfied, the color condition being satisfied if print data, which is an object of a print request, includes color page data, and a control section configured to selectively perform a first mode or a second mode when the print request is received and a correction execution condition is satisfied, wherein, in the first mode, the forming section is caused to print the test pattern and the correction section is caused to perform the correction function, before a printing process begins in response to the print request, and wherein, in the second mode, the forming section is caused to form the test pattern and the correction section is caused to perform the correction function after the printing process has begun in response to the print request and at least before a printing process for the color page data begins, on condition that the determination section determines that the color condition is satisfied, whereas the forming section is not caused to form the test pattern and the correction section is not caused to perform the correction function, in the second mode, if the determination section determines that the color condition is not satisfied.

7. A non-transitory computer readable recording medium storing instructions that, when executed, cause a computer of an information processing apparatus to perform a method comprising:

determining whether a color condition is satisfied, the color condition being satisfied if print data, which is an object of a print request, includes color page data, and selectively instructing an image forming apparatus to activate a first mode or a second mode when the print request is received and a correction execution condition is satisfied, wherein the image forming apparatus is configured to form a color image, measure at least one of a position and a density of a test pattern and perform a correction function for adjusting an image forming condition based on the measurement, wherein in the first mode, the image forming apparatus is caused to print the test pattern and to perform the correction function before a printing process begins in response to the print request, and wherein in the second mode, the image forming apparatus is caused to print the test pattern and to perform the correction function after the printing process has begun in response to the print request and at least before a printing process for the color page data begins, on condition that the color condition is satisfied, whereas the image forming apparatus is not caused to form the test pattern and is not caused to perform the correction function, in the second mode, if the color condition is not satisfied.

8. A non-transitory computer readable recording medium storing instructions that, when executed, cause a computer of an image forming apparatus, which includes a forming section configured to form a color image, to perform a method comprising:

measuring at least one of a position and a density of a test pattern formed by the forming section and perform a correction function for adjusting an image forming condition based on the measurement;

determining whether a color condition is satisfied, the color condition being satisfied if print data, which is an object of a print request, includes color page data; and selectively performing a first mode or a second mode when the print request is received and a correction execution condition is satisfied, wherein, in the first mode, the forming section is caused to print the test pattern and the correction function is caused to be performed before a printing process begins in response to the print request, and wherein, in the second mode, the forming section is caused to print the test pattern and the correction function is caused to be performed after the printing process has begun in response to the print request and at least before a printing process for the color page data begins, on condition that the color condition is satisfied, whereas the test pattern is not formed by the forming section and the correction function is not performed, in the second mode, if the color condition is not satisfied.

* * * * *